US011034510B2

(12) United States Patent
Hansley et al.

(10) Patent No.: US 11,034,510 B2
(45) Date of Patent: Jun. 15, 2021

(54) VESSEL WITH AGITATOR

(71) Applicant: NIETORP, LTD, Glendale, CO (US)

(72) Inventors: Joseph Todd Hansley, Glendale, CO (US); Dakota Sheets, Littleton, CO (US)

(*) Notice: Subject to any disclaimer, the term of this patent is extended or adjusted under 35 U.S.C. 154(b) by 0 days.

(21) Appl. No.: 16/019,445

(22) Filed: Jun. 26, 2018

(65) Prior Publication Data
US 2019/0039820 A1 Feb. 7, 2019

Related U.S. Application Data

(60) Provisional application No. 62/540,198, filed on Aug. 2, 2017.

(51) Int. Cl.
| | | |
|---|---|---|
| *B65D 85/816* | (2006.01) | |
| *B01F 15/00* | (2006.01) | |
| *A47J 43/27* | (2006.01) | |
| *B01F 13/00* | (2006.01) | |
| *B65D 39/00* | (2006.01) | |
| *B65D 75/58* | (2006.01) | |
| *B65D 75/00* | (2006.01) | |
| *A23L 2/66* | (2006.01) | |

(52) U.S. Cl.
CPC ........ *B65D 85/816* (2013.01); *B01F 13/0022* (2013.01); *B01F 13/0052* (2013.01); *B01F 15/0085* (2013.01); *B01F 15/00512* (2013.01); *B65D 39/0052* (2013.01); *B65D 75/008* (2013.01); *B65D 75/5883* (2013.01); *A23L 2/66* (2013.01); *A47J 43/27* (2013.01)

(58) Field of Classification Search
CPC .................. A47J 43/27; B01F 13/0022; B01F 13/005–0057; B01F 15/00512; B65D 75/008; B65D 85/72; B65D 85/804; B65D 85/816; B65D 39/0052; A23L 2/66
See application file for complete search history.

(56) References Cited

U.S. PATENT DOCUMENTS

| | | | | |
|---|---|---|---|---|
| 3,290,017 | A * | 12/1966 | Davies | B01F 11/0005 206/220 |
| 4,640,623 | A * | 2/1987 | Tornell | B01F 13/002 222/394 |
| 6,073,804 | A * | 6/2000 | Yquel | B65D 83/62 222/95 |
| 6,818,237 | B2 * | 11/2004 | Chidley | A23L 2/38 210/749 |
| 9,321,558 | B2 * | 4/2016 | Callahan | B65D 33/02 |
| D766,734 | S * | 9/2016 | Fitzsimmons | D9/709 |
| 9,821,284 | B2 * | 11/2017 | Johns | B65D 75/5883 |
| 2004/0047231 | A1 * | 3/2004 | Coll | A47J 43/27 366/130 |
| 2006/0273136 | A1 * | 12/2006 | Bachman | A45D 19/02 228/101 |
| 2017/0096263 | A1 * | 4/2017 | Baker | B65D 35/30 |
| 2018/0037367 | A1 * | 2/2018 | Musacchio | B65D 85/72 |

* cited by examiner

*Primary Examiner* — Michael McCullough

(57) ABSTRACT

Embodiments are described for a vessel with an aperture positioned at the top end of the vessel. A gasket having an opening is provided and disposed at the top end of the vessel such that the gasket is between the first and second sidewalls of the vessel. A selectively operable lid permits the opening of the vessel. At least one agitator is provided within the vessel to mix a stored material therein with a fluid.

20 Claims, 7 Drawing Sheets

VESSEL WITH AGITATOR

CROSS-REFERENCE TO RELATED APPLICATIONS

This application claims priority to U.S. Provisional Application 62/540,198 entitled "Vessel With Agitator" and filed Aug. 2, 2017 which is hereby incorporated by reference in its entirety.

FIELD

The present invention generally relates to vessels having an integrated agitator, and more specifically to a vessel for the storage, agitation, and consumption of supplements.

BACKGROUND

As consumer's lives become more and busier, the need to take in adequate nutrition on-the-go has increased. The use of supplements to ensure proper nutrition has become increasingly popular. Some of these supplements are distributed in the form of a bulk powder such as protein, and its various formulations. The population has become increasingly aware of the need for adequate protein as well as the timing related to the consumption of the protein. This provides the impetus for individuals to carry their supplements with them throughout the day.

Currently, many of these supplements, and especially protein, are sold in 1-5 pound containers which are bulky and inconvenient to transport. Nonetheless, many will transport these containers with them and aliquot servings of the powder as needed into a separate mixing vessel.

Some consumers have devised other means of transporting their daily requirements of powdered supplements, such as dispensing the powder into a bottle. This solves many of issues, however the ability to adequately mix the powder with a fluid is compromised.

It can be seen that an advance in the art of the storage, agitation, and consumption means for protein supplements is needed. A solution to this is disclosed in light of the invention herein.

SUMMARY OF THE INVENTION

Embodiments described herein provide for a mixing vessel having an agitator. The vessel has a first sidewall sealed to a second sidewall to define a cavity therebetween. An aperture is positioned at a top end of the vessel and a gasket having an opening is disposed at the top end of the vessel such that the gasket is between the first sidewall and the second sidewall. A selectively operable lid is engaged with the gasket while at least one agitator disposed within the vessel. The agitator has a central portion a plurality of protrusions extending therefrom. The vessel is configured to store a material therein while the agitator is configured to aid in the mixing of the material with a fluid.

In an embodiment, a member extends from the gasket permitting the releasable engagement of the lid. This may be accomplished by threading the member with the lid.

In an aspect, the aperture has a width less than the width of the top end. The gasket has an opening to permit the ingress and egress of fluid and foodstuff therein.

In an embodiment, the agitator is dimensioned to pass through the aperture but not pass through the opening of the gasket.

The vessel with agitator is provided as a prepackaged foodstuff product such that the foodstuff is suitably stored within the vessel for distribution.

In another aspect of the invention, a foodstuff mixing system is disclosed having a vessel partially filled with a foodstuff. The vessel has a first sidewall sealed to a second sidewall to define a cavity therebetween. An aperture is positioned at a top end of the vessel while a gasket having an opening is disposed between the first and second sidewalls. A selectively operable lid is engaged with the gasket and at least one agitator disposed within the vessel. The agitator has a central portion and a plurality of protrusions extending therefrom. An empty region within the vessel permits the storage of foodstuff and the addition of a fluid. In an embodiment, a user performs the steps of procuring the foodstuff mixing system followed by opening the lid thereof. The vessel is filled at least partially with a fluid agitated for a time period until a palatable mix is formed. Next, the user consumers the palatable fluid through the opening.

These and other features and advantages will become apparent from the following detailed description of illustrative embodiments thereof, which is to be read in connection with the accompanying drawings.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
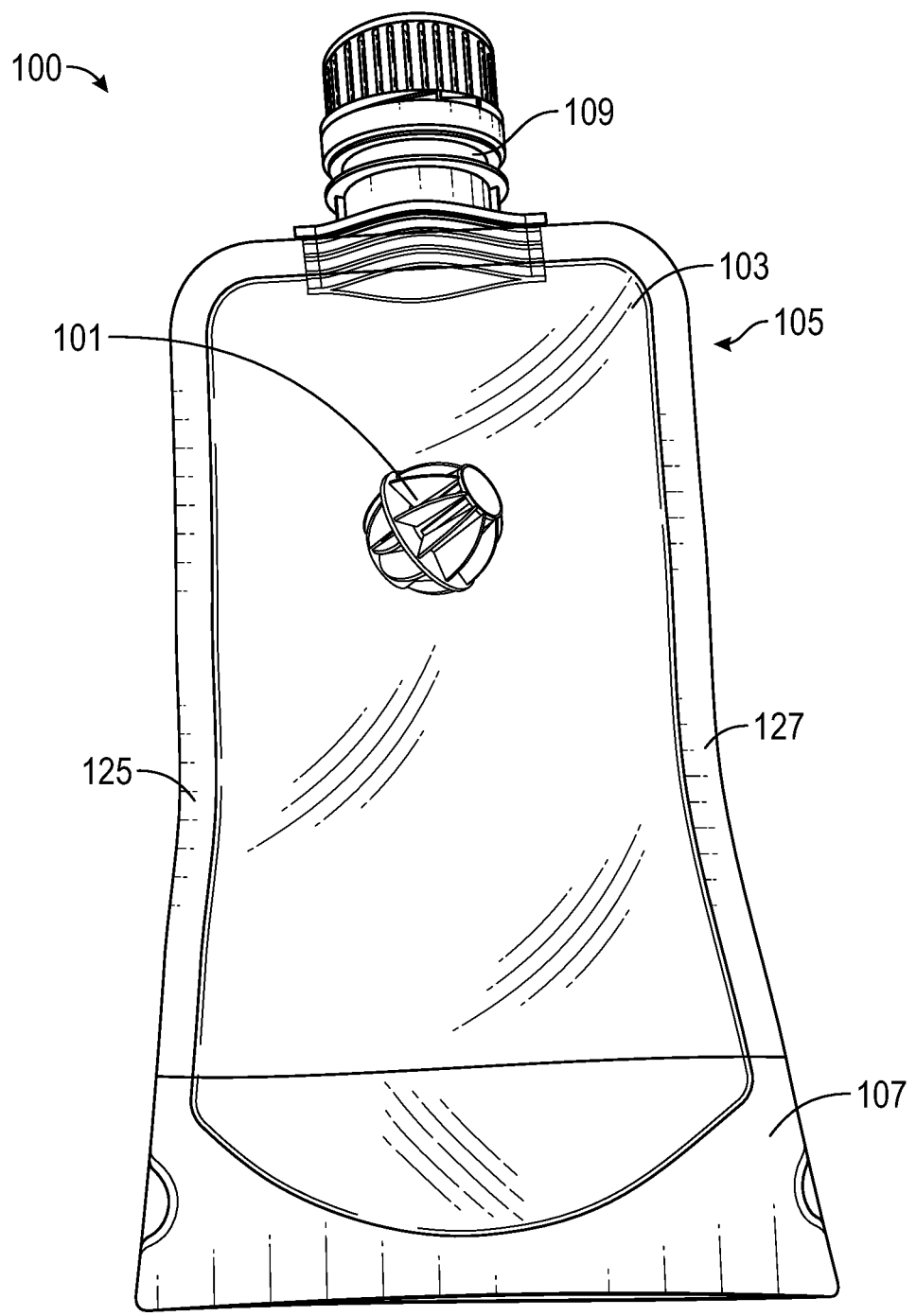
FIG. 1 illustrates a front elevation view of the device, according to an embodiment of the present invention.

The specific details of the single embodiment or variety of embodiments described herein are set forth in this application. Any specific details of the embodiments are used for demonstration purposes only and no unnecessary limitation or inferences are to be understood therefrom.

Any reference to "invention" within this document is a reference to an embodiment of a family of inventions, with no single embodiment including features that are necessarily included in all embodiments, unless otherwise stated. Furthermore, although there may be references to "advantage's" provided by some embodiments, other embodiments may not include those same advantages, or may include different advantages. Any advantages described herein are not to be construed as limiting to any of the claims.

Before describing in detail exemplary embodiments, it is noted that the embodiments reside primarily in combinations of components related to the system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In general, the invention described herein relates to a vessel wherein materials may be stored, mixed, and consumed therefrom. The container has at least a first and second sidewall, sealingly engaged to prohibit contents therein, whether liquid or solid, from excreting therefrom. Each sidewall forms a cavity within the vessel sufficiently dimensioned to receive a predetermined amount of a powdered supplement to be later mixed with a fluid. The vessel has a lid removably engaged with an aperture at an end of the vessel.

Figure 2:
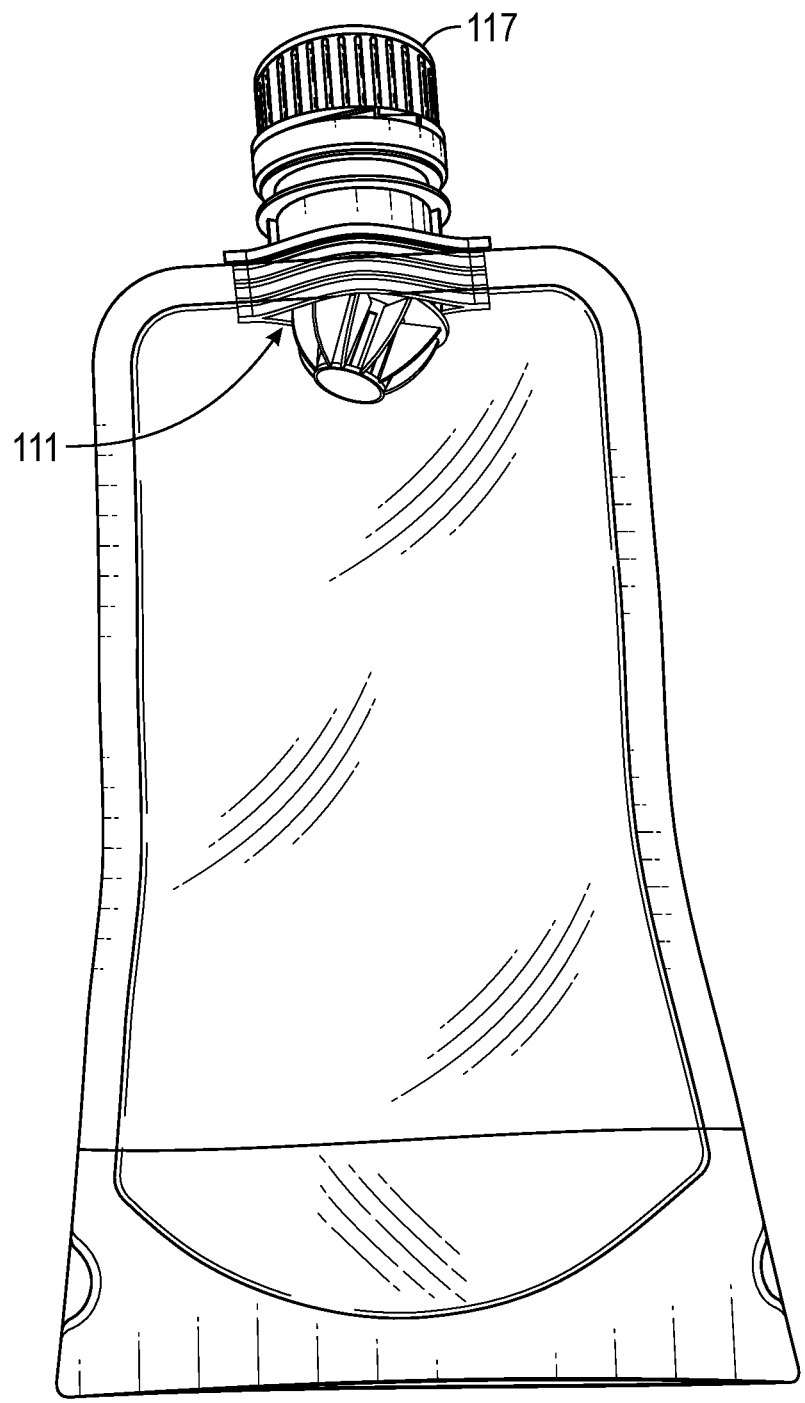
FIG. 2 illustrates a front elevation view of the device, according to an embodiment of the present invention.
Figure 3:
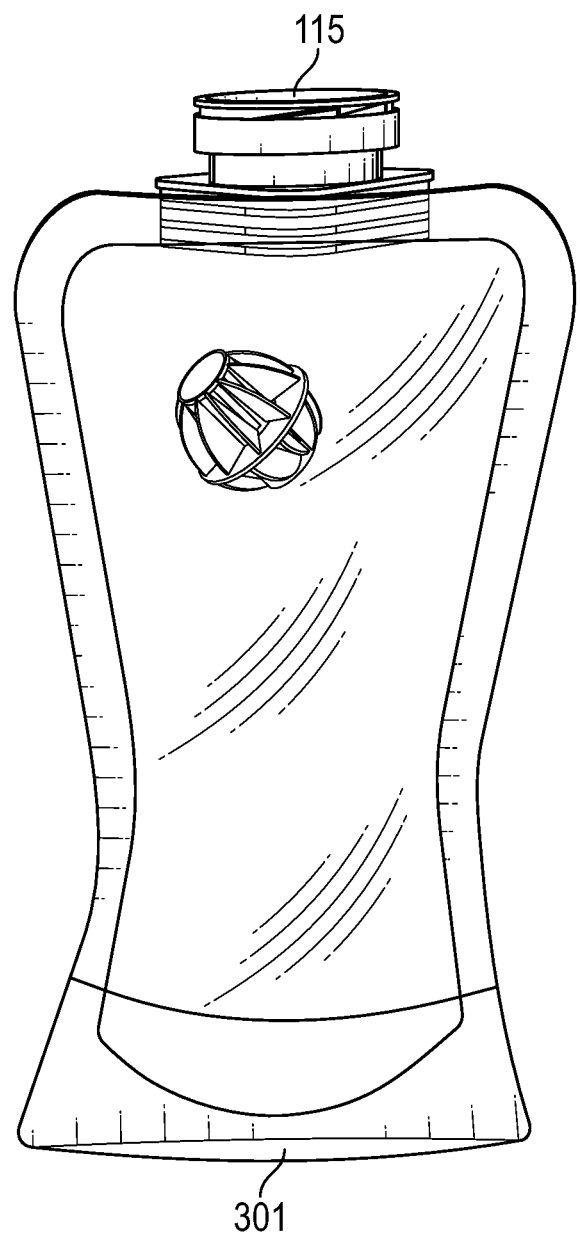
FIG. 3 illustrates a front elevation view of the device, according to an embodiment of the present invention.

In reference to FIGS. 1-3, the vessel 100 with agitator 101 is shown in an embodiment of the present invention. The vessel 100 may have at least a first and second sidewall 103, 105 sealingly engaged substantially near and around the perimeter of the vessel 100. Each sidewall 103, 105, when engaged with one another, forms a cavity therebetween wherein materials may be disposed. The vessel has a sealed bottom end 107 and a top end 109 adapted to decant materials within the cavity as well as receive external fluid in order to dispose the fluids into the vessel 100. Each sidewall may be made of a flexible material to absorb the force of repeated impacts of the agitator 101.

In a preferred embodiment, the vessel 100 acts as a storage container for a powdered medium such as a powdered protein supplement. During production, the powdered material is stored within the vessel such that the materials composition is preserved under similar conditions as in various packaging standards known in the art. The vessel 100 with material therein may be provided to the user as one of a set or kit, to provide a sufficient serving of the material based off of standard servings in the art of protein consumption. Preferentially, the vessel is adapted to retain between 5 grams and 100 grams of powdered material. During use, the user will open the lid 117 and dispose fluids through the opening 115. The fluid will then mix with the material inside of the cavity. The user may elect to re-engage the lid to seal the cavity. Mixing of the material with the fluid is facilitated by the agitator 101.

Figure 4:
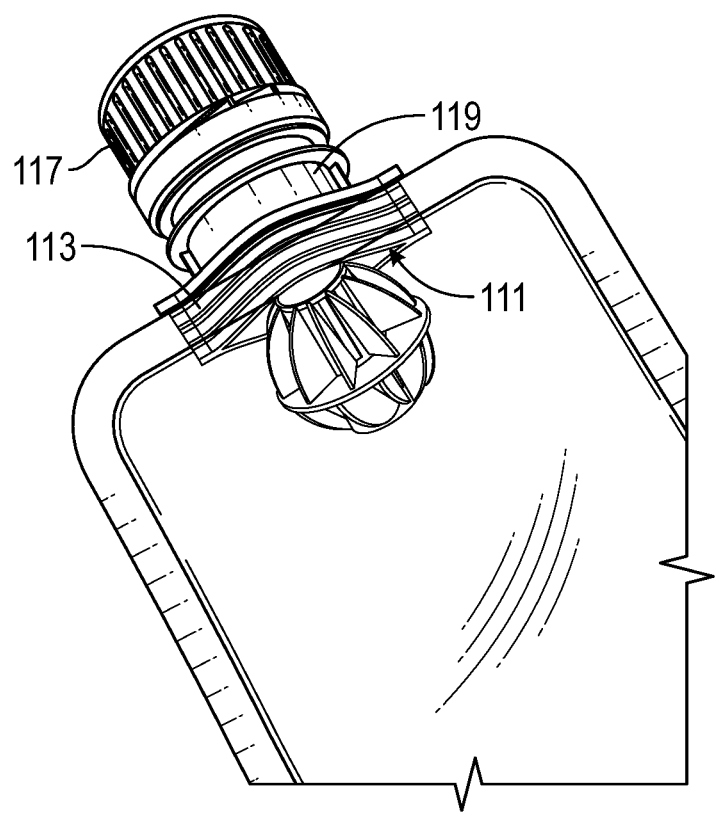
FIG. 4 illustrates a cutaway view of the device and agitator, according to an embodiment of the present invention.

In an embodiment, and in reference to FIG. 4, the top end 109 has an aperture 111 formed by the lack of sealing engagement with the first and second sidewalls 103, 105. The aperture is dimensioned to receive a gasket 113. The gasket 113 is sealingly engaged with each of the first and second sidewalls 103, 105 such that fluids are directed from the cavity, through the gasket 113, and out of an opening 115. The gasket 113 and opening 115 are dimensioned to retain the agitator 101 within the cavity of the vessel 100 to ensure that the user does not ingest the agitator 101 during use. Specifically, the agitator 101 has a diameter greater than the diameter of the aperture 111 and opening 115 to restrict the egress of the agitator 101 as it would be unsafe for consumption.

In a preferred embodiment, the top end 109 has a threadingly engaged lid 117 to permit the user to open and close the cavity to permit or prohibit the decantation of materials therein. A threaded member 119 is positioned between the gasket 113 and the lid 117. One skilled in the art may appreciate that any form of the lid may be used as known in the arts such that the user may selectively remove the lid 117 throughout use.

Figure 5:
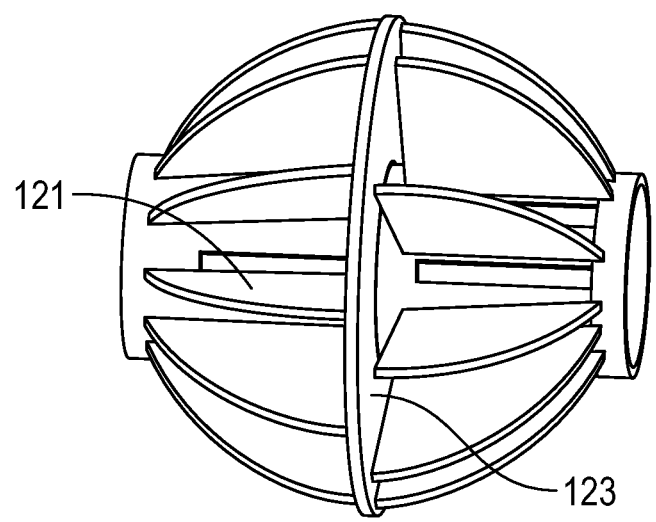
FIG. 5 illustrates a front elevation view of the agitator, according to an embodiment of the present invention.

In reference to FIG. 5, the agitator 101 is shown disassociated from the vessel 100. During production, the agitator is disposed within the cavity before the cavity sealed either by sealing the sidewalls with one another or sealing the gasket 113 to the vessel 100. This allows for the agitator to be larger than the opening and ensures that the agitator is not accidentally ingested by the user during regular use. It is common that materials do not readily mix with water to form a solution. For example, protein powder, in any of its various forms and compositions, must be agitated to form a mixture with water, milk, and other commonly used fluids. To facilitate a desirable and palatable mixture of the material with the fluid, the agitator has a plurality of protrusions 121 extending from a central portion 123. Each protrusion agitates the fluid to promote mixing. In the illustrated embodiment, the agitator is spherical in its overall shape and is constructed to forcibly contact the interior of the cavity during agitation. The geometry of the agitator may facilitate a tumbling movement during agitations such that each of the protrusions rotates about a central rotational axis during use and further increasing the turbid nature of the mixing process. In an embodiment, the agitator may have one or more radial members extending about a circumference of the agitator 101 to further promote the tumbling of the agitator within the cavity.

In one embodiment, each protrusion is a planar surface acting as a paddle to suitably mix the contents therein.

The vessel described herein is intended to be used as a single-use mixing vessel. With this in mind, materials used should be directed to commonly used single-use materials known in the arts of storage containers which facilitate human consumption therefrom. The material of each sidewall 113,115 should be capable of encountering and withstanding repeated random collisions supplied by the internal agitator 101 such that structural damage is avoided.

In an embodiment, the bottom end 107 of the cavity is shaped as semi-dome. The semi-dome is formed by the sealingly engaged sidewalls 103, 105 and separates first and second sides 125,127 of the vessel. This semi-dome portion facilitates the rotation of the spherical agitator 101 about the semi-dome shape of the bottom end to redirect the acceleration of the agitator 101 within the cavity. In this manner, as the agitator contacts the semi-dome, acceleration is facilitated and increase along the semi-dome to promote the increase in speed of the agitator within the cavity. As the user shakes the vessel, a rhythmic oscillation of the agitator may be realized to increase the efficiency of the agitation and result in a more desirable mixture of fluid and material.

In alternate embodiments, the agitator may be one of a plurality of shapes including any polyhedral shape to promote agitation.

In alternate embodiment, the vessel may be comprised of opaque, light reflecting, heat reflecting, or otherwise element-impermeable materials to promote a longer shelf life of the materials stored therein.

In an alternate embodiment, the vessel may be comprised of a continuous and integrally molded sidewall to reduce the chances of the excretion of materials and/or reduce the cost of production.

A method for storing, mixing, and providing a supplement to a human—e.g. a user—is described. First, a powdered supplement, such as a protein powder composition is disposed within a semi-sealed vessel. Once an adequate amount of the composition is placed within the cavity of the vessel, the vessel is sealed by a lid, cap, or similar utility. During use, the user may then dispose fluid into the vessel and agitate the vessel to mix the fluid and composition into a desirable and palatable texture. The user may then consume the mixture through the opening and dispose of the vessel after use.

Figure 6:
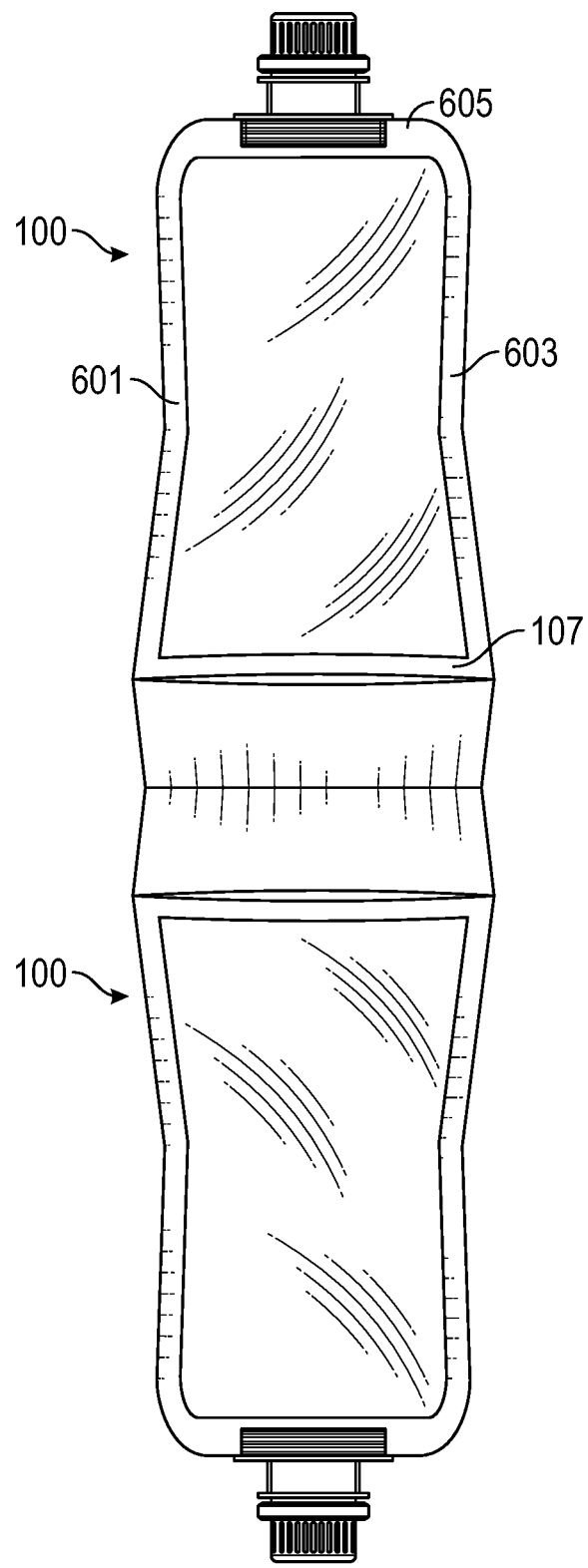
FIG. 6 illustrates a front and rear elevation view of the device affixed to one another, according to an embodiment of the present invention.

FIG. 6 illustrates an embodiment wherein an example of suitable dimensions to achieve the spirit of the invention are disclosed. It can be appreciated that any combinations of dimensions may be used provided that the specifications disclosed above are attained. In the exemplary embodiment, the product is provided with a height of about 18 cm and an overall width of 10.2 cm. Edges 601, 603 are 0.8 cm each to ensure the proper sealed engagement between the first and second sidewalls 103, 105. The top end 109 has a sealed edge 605 of 1.3 cm. The gasket 113 is dimensioned having a lesser width than the width of the top end (8.4 cm). The bottom end 107 is sealed having a sealed portion of 3.5 cm. During production, the bottom end 107 may be attached to the bottom end 107 of an identical vessel 100.

Figure 7:
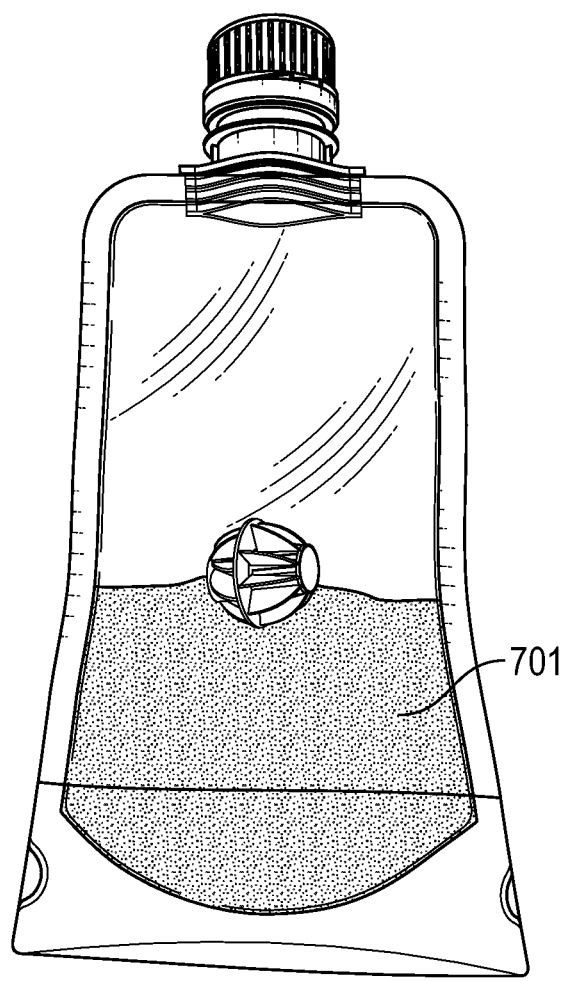
FIG. 7 illustrates a front elevation view of the device having contents therein, according to an embodiment of the present invention.
Figure 8:
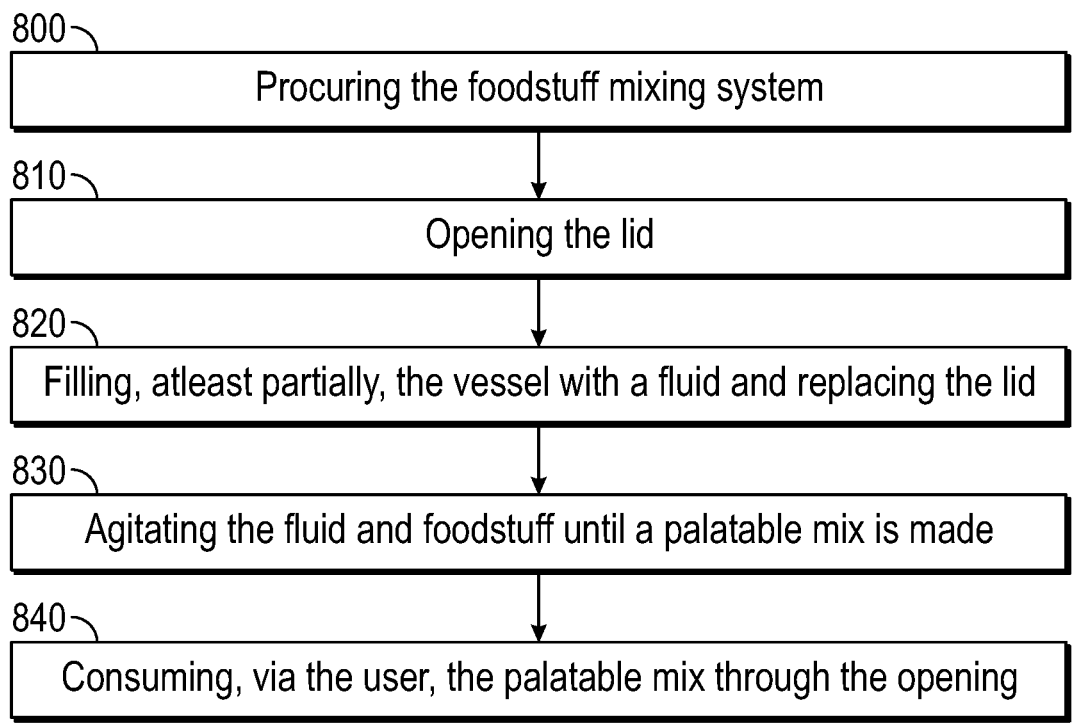
FIG. 8 illustrates a flowchart of a method of use, according to an embodiment of the present invention.

Now referring to FIG. 7, the prepackaged foodstuff mixing system is illustrated having the vessel 100 with a foodstuff 701 disposed therein. This illustrates how the user may procure the system as purchased. During use and as illustrated in FIG. 7 and FIG. 8, a user first procures the vessel having the prepacked foodstuff therein in step 800. In step 810 the user removes the lid and in step 820 the user at least partially fills the vessel with a fluid. Once filled, the lid is re-engaged to seal the vessel and in step 830 the user agitates the vessel with the aid of the agitator to suitably mix the materials therein. In step 840, the user consumes the materials via the opening.

In one embodiment, the flexible material of the vessel 100 permits the user to easily transport in a pocket, backpack, gym bag, or similar area while absorbing impact and reducing detriment to the vessel and surrounding items.

In an embodiment, the lid is provided as a sealed component to ensure a hermetic seal of the vessel. The lid may be sealed to the rim 201 (see FIG. 2) as known in the arts.

The gasket is comprised of a perimeter 301 that is sealed with the inner surface of the top end 109 of the first and second sidewalls 103, 105.

While many embodiments exist, the foodstuff may include but are not limited to: a supplement powder, a protein powder, a meal replacement powder, a medicament, a vitamin mixture, or other dissolvable foodstuff known in the arts. Other uses may include the mixing of eggs, paint, salad dressings, solid suspensions, viscous fluids, and other food or fluid products.

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A mixing device comprising:
   a vessel comprising:
      a first sidewall sealed to a second sidewall to define a cavity therebetween;
      an aperture positioned at a top end of the vessel;
      a gasket having an opening, the gasket being disposed at the top end of the vessel such that the gasket is between the first sidewall and the second sidewall;
      a selectively operable lid engageable with the gasket;
   at least one agitator retained within the vessel, the at least one agitator comprising:
      a generally spherical shape with opposing first and second poles;
      a core extending between the opposing first and second poles;
      a circular central portion extending radially out from a central region of the core; and
      a plurality of protrusions extending from the central portion at least partially along a length of the core and radially out from the core, the plurality of protrusions being configured to mix a material with a fluid in the cavity,
      the at least one agitator being dimensioned to be retained within the cavity such that the at least one agitator is not removeable from the cavity.

2. The device of claim 1, further comprising a member extending from the gasket, wherein the member is configured to releasably engages with the lid.

3. The device of claim 2, wherein the lid is configured to threadingly engage the member.

4. The device of claim 1, wherein the aperture has a width less than a width of the top end.

5. The device of claim 1, wherein the gasket has an opening to permit the ingress and egress of fluid and foodstuff therethrough.

6. The device of claim 1, wherein the agitator is dimensioned to pass through the aperture but not pass through the opening of the gasket.

7. The device of claim 1 provided as a foodstuff product, the foodstuff product comprising a foodstuff disposed within the vessel.

8. The device of claim 7, wherein the foodstuff product is prepackaged within the cavity.

9. The device of claim 1, wherein the plurality of protrusions comprise curved outer profiles.

10. A mixing device comprising:
    a vessel configured to have a material disposed therein, the vessel comprising:
       a first sidewall sealed to a second sidewall, each sidewall having a left side, a right side, a bottom end, and a top end, the left side, the right side, the bottom end, and the top end of the first and second sidewalls being sealed at edges thereof to define a cavity therebetween;

an aperture positioned between the first sidewall and the second sidewall at the top end of the vessel;

a gasket positioned in the aperture, the gasket having an opening configured to enable transfer of foodstuff therethrough; and a lid selectively engageable with the gasket;

at least one agitator disposed within the vessel, the at least one agitator comprising:

a generally spherical shape;

a generally cylindrical core;

a circular central portion extending radially out from a central region of the core; and a plurality of protrusions extending Ii) from the central portion along at least a portion of a length of the core and (ii) radially out from the core, the plurality of protrusions being spaced apart from one another circumferentially about the core, the at least one agitator being dimensioned to pass through the aperture but not pass through the opening of the gasket, the at least one agitator being configured to aid in mixing the material in the vessel with a fluid.

11. The device of claim 10 provided as a prepackaged foodstuff product, the material disposed in the vessel comprises a foodstuff product.

12. The device of claim 11, further comprising a member extending from the gasket, the member being releasably engageable with the lid.

13. The device of claim 12, wherein the lid is configured to be threadingly engaged with the member.

14. The device of claim 11, wherein the aperture has a width less than a width of the top end.

15. A foodstuff mixing system comprising:

a vessel partially filled with a foodstuff, the vessel comprising:

a first sidewall sealed to a second sidewall to define a cavity therebetween;

an aperture positioned at a top end of the vessel, the aperture being dimensioned to retain at least one spherical agitator retained within the vessel;

a gasket having an opening, the gasket being disposed at the top end of the vessel such that the gasket is positioned between the first sidewall and the second sidewall; and a lid selectively engageable with the gasket, the at least one spherical agitator comprising opposing first and second poles, a core extending between the opposing first and second poles, a circular central portion extending radially out from the core, and a plurality of protrusions extending from the central portion and radially out from the core, the at least one spherical agitator being configured to agitate the foodstuff to mix the foodstuff with a liquid in the vessel.

16. The system of claim 15, wherein the plurality of protrusions comprises curved outer profiles.

17. The system of claim 15, further comprising a member extending from the gasket, the member being configured to releasably engages the lid.

18. The system of claim 15, wherein the lid is configured to threadingly engaged the member.

19. The system of claim 15, wherein the aperture has a width less than a width of the top end.

20. The system of claim 15, wherein the at least one spherical agitator is dimensioned to pass through the aperture but not pass through the opening of the gasket.

* * * * *